Jan. 31, 1939. S. T. EVANS 2,145,647
STEP FOR VEHICLES
Filed Jan. 28, 1937
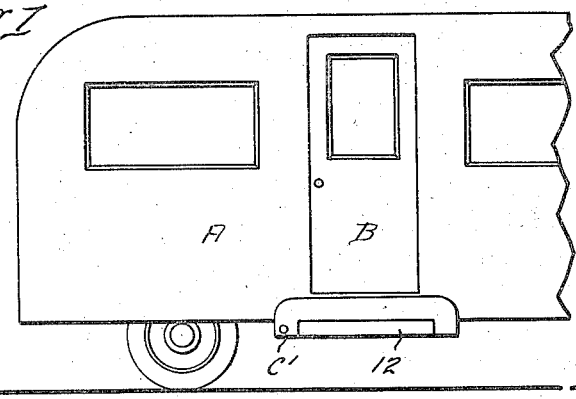
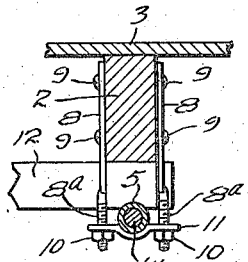
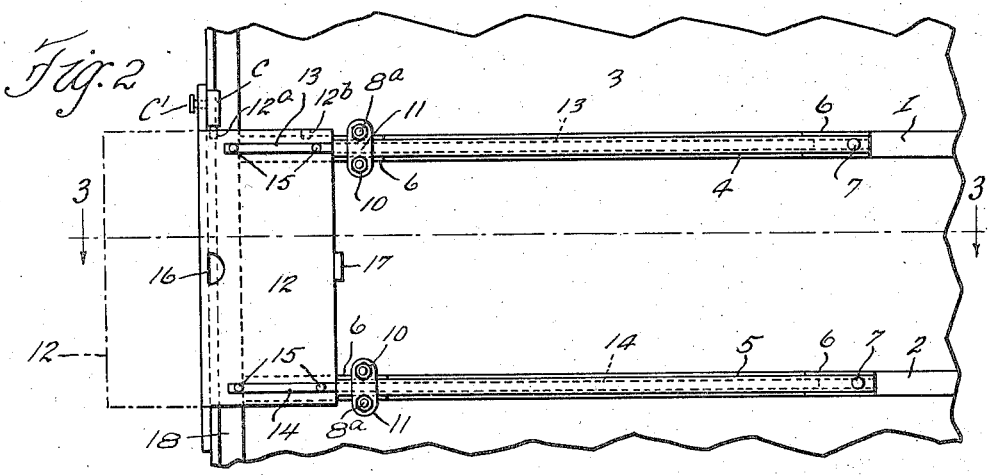
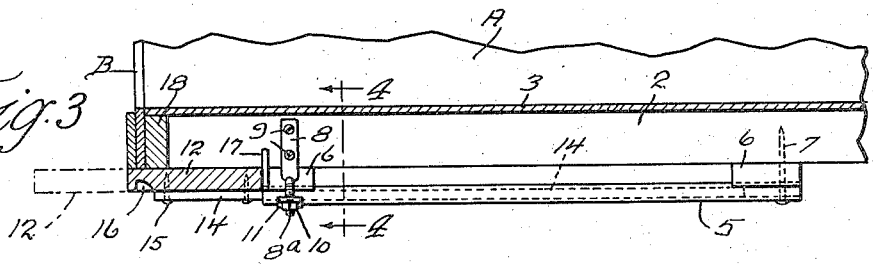
INVENTOR.
Samuel T. Evans,
BY Hull, Buck & West
ATTORNEYS.

Patented Jan. 31, 1939

2,145,647

UNITED STATES PATENT OFFICE 2,145,647

STEP FOR VEHICLES

Samuel T. Evans, Cleveland, Ohio

Application January 28, 1937, Serial No. 122,820

2 Claims. (Cl. 280—166)

This invention relates to steps for vehicles and more particularly to steps which are especially adapted for application to and use with vehicles having side doors, as exemplified by house-trailers.

The general purpose and object of this invention is to provide for a vehicle of the character mentioned a step which can be conveniently, efficiently, and economically installed in operative relation to the door of said vehicle; and which can be conveniently moved into and out of operative position, as occasion may require.

Further and more specific objects and advantages of my invention will be described hereinafter in the specification and will be realized in and through the construction, arrangement, and operation of the various parts shown in the drawing hereof, wherein Fig. 1 represents a side elevation of a portion of a trailer having my invention applied thereto; Fig. 2 a detail, in bottom plan view, of a portion of the said trailer, showing my step and the means for securing the same to the trailer frame; Fig. 3 a detail in section corresponding to the line 3—3 of Fig. 2; Fig. 4 a detail in section corresponding to the line 4—4 of Fig. 3.

Describing by reference characters the parts illustrated herein, A denotes a portion of the body of a house-trailer having the door B between the front and the rear thereof.

1 and 2 denote beams extending transversely beneath the floor 3 of the trailer and between the side frame members, said beams being located on opposite sides of the door opening. 4 and 5 denote guides secured respectively to the beams 1 and 2. These guides, as shown herein, are preferably of tubing and are fastened to their respective beams in any convenient manner, as by securing spacing blocks 6 to the said beams and by securing the tubes to said beams and blocks. The inner ends of the tubes may be secured to the corresponding blocks and the portions of the beams thereabove in any convenient and simple manner, as by means of spikes or screws 7, while the outer ends may be secured to their respective blocks and beams by a type of U-bolt, which may consist of straps 8 fastened to the beams, as by means of screws 9, and having threaded lower ends 9ª by means of which and nuts 10, suitable upwardly concaved cross plates 11 are supported from the threaded ends and, in turn, engage and support the inner ends of the tubes.

It will be noted that the outer ends of the tubes 4 and 5 do not extend as far as the adjacent ends of the cross beams to which they are secured, being spaced therefrom a distance substantially equal to the thickness of the step, which will now be described.

The step as shown herein consists of a tread member 12, which may be of any desired material, such as wood of appropriate strength and thickness. 13 and 14 denote rods or tubes which are secured to the underside of the tread member 12, as by means of nails or screws 15, and are slidably mounted in and guided by the tubes 4 and 5 respectively, and are of such length as to enable the tubes to form a strong and sufficient support for the step when in use. The tread member 12 is of such width and the adjacent blocks 6 are so located as to enable it, when in the closed position shown in full lines in Figs. 2 and 3, to be projected entirely beneath the side of the vehicle; it may be provided with a hand hold 16, beneath the outer portion thereof, and also with a stop 17 at its inner end, to limit the outward movement thereof by engagement with the side frame member 18 which is beneath the doorway.

With the parts constructed and arranged as described, it is believed that the operation will be readily understood. When not in use, the step may be moved to the closed position shown in full lines in Figs. 2 and 3; when in use, it may be moved to the position shown in dotted lines in said views. It may be retained in both open and closed positions by a sliding latch bar C having an operating handle or knob C'. The end of the latch bar is adapted to enter the recess 12ª in the door when the door is in closed position and the recess 12ᵇ when the door is in open position.

Due to the construction shown and described herein, it will be evident that my slidable step may be readily applied to existing types of trailers and similar vehicles without any special alteration in such vehicles; also that the installation can be effected quickly, conveniently, and with small attendant expense.

Having thus described my invention, what I claim is:

1. The combination, with a vehicle having longitudinal frame members, a doorway in a side thereof above one of said members and a cross beam extending transversely of the vehicle on each side of said doorway between said members, of a step comprising a tread member located below said doorway, and means for slidably supporting the said step from the said cross beams and below the said doorway, said means comprising a guiding and supporting member secured to and carried by and beneath each of said cross beams, and members secured to the underside of the said tread member and each slidably engaging a guiding and supporting member.

2. The combination, with a vehicle having longitudinal frame members, a doorway in a side thereof above one of said members and a cross beam extending transversely of the vehicle on each side of said doorway between said members, of a step comprising a tread member located below said doorway, and means for slidably supporting the said step from the said cross beams and below the said doorway, said means comprising a tube secured to and carried by each of said cross beams, and members secured to the underside of the said tread member and each slidably engaging one of said tubes.

SAMUEL T. EVANS.